United States Patent Office 3,450,598
Patented June 17, 1969

3,450,598
METHOD FOR CELL PROPAGATION
John A. Welsh, Rockville, Md., and Frederick H. Johnson, Jr., Washington, D.C., assignors to Flow Laboratories, Inc., Rockville, Md., a corporation of Delaware
No Drawing. Filed Aug. 24, 1965, Ser. No. 482,271
Int. Cl. C12k 9/00
U.S. Cl. 195—1.8                              8 Claims

ABSTRACT OF THE DISCLOSURE

A process is provided for the production of large quantities of mammalian diploid cells in vitro in which diploid cells are suspended in a nutrient tissue culture medium and planted within a roller tube, the cells and medium occupying substantially less than the full volume of the tube. The cells are propagated by incubation while revolving the tube at a speed of from 4 to 60 revolutions per hour until a confluent sheet of diploid cells is formed on the inner wall of the tube. After incubation, the cells are released from the walls of the tube, agitated to disperse them into small aggregates of cells, and harvested.

---

This invention relates to the propagation of mammalian cells in vitro. More particularly, this inveniton relates to a new method of propagating mammalian cells, especially diploid cells, in large quantities.

The art or science to which this invention relates has come into prominence only very recently. The invention is directed to a new method for propagating and proliferating mammalian cells in vitro, i.e., outside the body of an animal or human host. Within the last few years there has been an ever increasing demand for larger and larger quantities of living mammalian cells, or as they are commonly called—tissue cultures.

Mammalian tissue cultures are in high demand today for use in medical research and diagnosis and particularly as substrates for culturing various infectious agents such as viruses. Prior methods of propagating tissue cultures have proved unsatisfactory for keeping up with the increasing demand for large scale propagation of cells on an economical basis, particularly those cells which must be grown in monolayer as opposed to suspension cultures. Perhaps the best known present method for propagating mammalian cells is by growing them on the flat side of a stationary bottle, typically, a 32-ounce prescription bottle.

In this method cells from an appropriate source are planted in the bottle together with a supply of nutrient tissue culture medium. The bottle is placed in an incubator on its flat side and the cells proceed to attach themselves to and to adhere to that flat side of the bottle which is covered by the tissue culture medium. With a 32-ounce prescription bottle, approximately 50 ml. of tissue culture medium is typically used.

The bottle is then incubated for a period of from 3 to 6 days in an incubator maintained at a temperature of about 37° C. After a sufficient residence time in the incubator to develop a confluent or whole sheet of cells on the side of the bottle that is covered by tissue culture medium, the spent medium may be poured off and the cells removed by appropriate mechanical means, such as scraping with a rubber implement, or by bathing them in a cell-releasing solution such as trypsin, versine, viokase, or other similar enzyme or chelating agent, to release them from the glass surface.

After the cells have been released, such as by use of a trypsinizing solution, they may be dispersed by aspiration or other appropriate means. Additional tissue culture medium may then be added to the cells to neutralize the cell-releasing solution and to prepare them for replanting in a new bottle or for division into tubes for storage or shipment. Typically, when cells are harvested from a stationary bottle, they may be divided into two new bottles or sometimes as many as four or more new bottles. When the cells are divided into two bottles, this is known as a one-to-two split, and when they are divided into four bottles, this is known as a one-to-four split, and so forth.

Many types of mammalian cells have been successfully grown in tissue culture processes of the type just described. The method is particularly successful when the cells are of the heteroploid type, or cells which possess an abnormal or different number of chromosomes from normal cells of the same type and which exhibit the ability to regenerate an indefinite number of times.

Much more difficulty, however, has been encountered in attempts to propagate and proliferate diploid cells. Diploid cells in contrast to heteroploid cells are normal cells in that they possess the normal number of chromosomes for the particular host species and do not have the ability to regenerate indefinitely. After regenerating a finite and fairly predictable number of times, diploid cells experience senescence or death.

Many practical difficulties have been encountered in attempts to propagate diploid cells in large economical quantites by the stationary bottle method. The method itself is inherently inefficient. A large number of bottles must be handled by a highly skilled operator to grow any substantial quantity of cells, and the bottles take up large amounts of space in an incubator for the number of cells produced.

Not surprisingly, while diploid cells are among the most difficult cells to propagate, they are also in high demand. Large quantities of these cells are needed for medical research and diagnosis. They are particularly needed in developing antivirus vaccines through attenuation of virus strains by serial passages through tissue cultures. Human diploid tissue cultures, in particular, are in demand for maintaining isolated human viruses and growing them outside of a human host. In the past it has been possible to keep some virus strains alive in animal hosts but this is obviously impractical with human hosts where the effects of the virus could be devastating on the host.

Although successive has been achieved in propagating heteroploid mammalian cells in suspension type cultures, no significant success has been attained in propagating diploid cells in suspension types cultures. Accordingly, primary interest in methods of propagating and proliferating diploid cells has been concentrated on monolayer cultures. To date, monolayer cultures have been successfully propagated only on glass-wall containers, and on some types of plastic or metal wall containers, with the cells bathed in suitable tissue culture media.

The economics of producing cells in monolayer systems has presented a formidable problem. The ultimate limiting parameter on cost reduction is the amount of media required to produce each cell. And one particular problem with present methods of monolayer tissue culturing has been the high cost of media per number of cells produced.

In view of the foregoing, it is a primary object of this invention to provide a new and improved method of propagating and proliferating mammalian cells, particularly diploid cells, in a monolayer system that gives far greater yields per volume of incubator space, per man hour of handling, and per unit of media than has been possible with other methods.

Another object of this invention is to provide a new and improved method of propagating and proliferating mammalian cells in vitro that uses only 30 to 40% as much media per cell produced as the present stationary bottle method.

An additional object of this invention is to provide a new and improved method of propagating and proliferating mammalian cells in vitro in which a much greater density of cells can be produced per unit volume of incubator space and per man hour of handling than is possible with the old stationary bottle method.

Another object of this invention is to provide a new and improved method of propagating and proliferating mammalian cells in vitro in which the cells attach themselves to the inner wall of a roller tube rotating at a speed of from 4 to 60 revolutions per hour (r.p.h.), whereby the cells are intermittently immersed in a tissue culture medium and withdrawn therefrom for a brief period but while withdrawn are still wetted by a thin film of such medium.

A further object of this invention is to provide a new and improved method of propagating and proliferating diploid cells in a practical economical manner by which such cells can be produced in gram and kilogram quantities.

To illustrate, where, as is commonly understood in the art, one (1) gram of cells equals approximately $5 \times 10^8$ cells and one (1) kilogram of cells equals approximately $5 \times 10^{11}$ cells, one man in one week, by the method of this invention, can produce more than 100 grams of diploid cells or 50 billion cells. This is equivalent to approximately 50,000 ml. of cell suspension and represents a tenfold increase over the prior art methods.

Viewed in another way, and in the context of the prior art, one man in one week can produce sufficient cells to plant 10,000 32-ounce prescription bottles, or 400,000 conventional shipment tubes.

Similarly, by the method of this invention it is possible for eight men in one 40 hour week to produce one (1) full kilogram of cells working in one 27' x 40' incubating room.

A still further object of this invention is to provide a method for propagating and proliferating mammalian cells which requires less time, less effort, and introduces less risk of contamination than prior methods.

Additional advantages and objects will be set forth in part in the description that follows, and in part will be obvious from the description, or may be learned by practice of the invention, the objects and advantages being realized and attained by means of the compositions, methods and processes particularly pointed out in the appended claims.

To achieve the foregoing objects and in accordance with its purpose, this invention embodies, as broadly described, a new and improved method of propagating mammalian cells in vitro which comprises the steps of:

(a) Aseptically planting mammalian cells suspended in a nutrient tissue culture medium within a roller tube, the cells and medium occupying substantially less than the full volume of the tube, (b) Sealing the tube and placing it in an incubator with its longitudinal axis substantially horizontal, (c) Revolving the tube at a speed of from 4 to 60 r.p.h. while it is incubated at a temperature of from 35 to 37.5° C. to permit the cells and medium to come into contact with substantially the entire inner surface of the tube, (d) Maintaining the pH of the tissue culture medium at between 6.8 and 7.8, (e) Revolving the tube in the incubator until a substantially confluent sheet of cells is formed on the walls of the tube, (f) Releasing the cells from the inner walls of the tube, (g) Agitating the released cells to disperse them into small aggregates of cells, and (h) Harvesting the cells.

In accordance with the invention, it has been discovered that the method can be successfully operated, when the tubes are revolved at speeds that range from 4 r.p.h. to 60 r.p.h. Below 4 r.p.h., diploid cells attach to the tubes so quickly that the majority of the cells attach in one section of the tube instead of uniformly distributing themselves around the inner walls of the tube as is desired; it may thus become impossible to obtain a confluent sheet of cells because of their initial concentration in one area of the tube. Above 60 r.p.h., the tube wall moves too fast for the cells to attach properly, and even if a sheet is formed, it will be ragged and uneven without the desired uniform distribution and close-packing of cells that are obtained within the proper speed range.

It has been discovered that the preferred speed at which the tubes should be revolved for best possible results is about 14 r.p.h.

Further in accordance with the invention, the roller tubes should have an inside diameter of from 1 to 25 centimeters, preferably about 6.5 centimeters. Preferably, also, the tubes are made of Pyrex glass.

For preferred results it has been found that the gas space within the tube should comprise from about 1.5 to 3% $CO_2$ and the balance air. In practice, this is achieved by charging a substantial portion of the gas space in the tube with a mixture of air and 5% $CO_2$. When the tube then achieves a gas space comprising about 2% $CO_2$ and the balance air, the desired gas-liquid equilibrium will form to assure a pH in the tissue culture medium of between about 7 and 7.8. The partial pressure of $CO_2$ in the gas phase assures replenishment of carbon for the carbonate ion buffering system contained within the tissue culture medium. This carbonate buffering system is particularly useful in keeping the pH from rising too high during the initial or uptake phase of cell growth in the incubator. The $CO_2$ also enhances adherence of the cells to the glass surface of the tube.

In general, culture media previously found suitable for mammalian cell and tissue culture may be used in the method of this invention. Typically, such culture media contain the known essential amino acids, mineral salts, vitamins and carbohydrate nutrients, together with a mammalian serum. Preferably fungistatic and bacteriostatic substances are added to the medium to prevent the growth of microorganisms.

For a clearer understanding of the invention, a specific example of it is set forth below. This example is merely illustrative and is not to be understood as limiting the scope and underlying principles of the invention in any way.

Example

An existing cell culture containing approximately 8 to 10 million cells of WI 38 human embryonic lung tissue isolated by L. Hayflick was cultured in a 32-ounce prescription bottle into a confluent sheet by the stationary method earlier described. The cells were released from the flat inner wall of the bottle by "trypsinizing" with a trypsin-containing cell-releasing solution. For trypsinizing a 2.5% aqueous solution of trypsin was diluted 1 to 10 to a 0.25% trypsin solution with Earle's balanced salt solution minus the usual calcium and magnesium salts ($Ca^{++}$ and $Mg^{++}$ tend to cause cell clumping and adhesion). The composition of the Earle's balanced salt solution was

| | | |
|---|---|---|
| Sodium chloride (NaCl) | grams | 68 |
| Potassium chloride (KCl) | do | 4 |
| Sodium phosphate, monobasic ($NaH_2PO_4H_2$) | do | 1.4 |
| Glucose | do | 10 |
| Phenol red | do | 0.2 |
| Redistilled water | liters | 1 |

The 0.25% trypsin solution was placed in the 32-ounce prescription bottle after the spent nutrient tissue culture media had been poured off. After standing for about 10 to 15 minutes, the prescription bottle was agitated and the sheet of cells was observed to come loose from the glass surface and to disperse into substantially individual cells.

The cells from the prescription bottle were then transferred ("split") into a Pyrex glass roller tube having approximately a 6.3 centimeter inside diameter and a length of about 62 centimeters. After the transfer the tube contained the approximately 8 to 10 million cells that were trypsinized from the prescription bottle. To the tube there was then added from 150 to 200 ml. of Basal Medium Eagle's 90% plus fetal calf serum 10% ($BME_{90}Fetal\ Calf_{10}$) as a nutrient tissue culture medium. The composition of the Basal Medium Eagle's (BME) constituting 90% of the $BME_{90}Fetal\ Calf_{10}$ was as follows:

|  | Mg./l. |
| --- | --- |
| l-arginine chlorhydrate | 105 |
| l-cystine | 24 |
| l-histidine monohydrochlorhydrate | 31 |
| l-isoleucine | 52 |
| l-leucine | 52 |
| l-lysine chlorhydrate | 58 |
| l-methionine | 15 |
| l-phenylalanine | 32 |
| l-threonine | 48 |
| l-tryptophan | 10 |
| l-tyrosine | 36 |
| l-valine | 46 |
| Choline chloride | 1.00 |
| Folic acid | 1.00 |
| Isoinositol | 1.00 |
| Nicotinamide | 1.00 |
| Pantothenic acid | 1.00 |
| Pyridoxal | 1.00 |
| Thiamine | 1.00 |
| Riboflavin | 0.10 |
| NaCl | 6800 |
| KCl | 400 |
| $NaH_2PO_4 2H_2O$ | 150 |
| $NaHCO_3$ | 2000 |
| $CaCl_2$ | 200 |
| $MgCl_2$ | 200 |
| Glucose | 1000 |
| l-glutamine | 212 |
| Phenol red | 20 |
| Penicillin | ([1]) |
| Streptomycin | 50 |

[1] 50,000 I.U.

Both the trypsinized cells and the $BME_{90}Fetal\ Calf_{10}$ were aseptically poured into the roller tube.

The contents of the tube were then gassed with a mixture of 5% $CO_2$ and air for about 30 seconds. From ⅓ to ½ of the air in the tube was displaced as measured by foam rising in the tube. By this step a concentration of from 2 to 3% $CO_2$ in air was provided in the gas phase within the tube. As earlier described, the purpose of the addition of $CO_2$ was to keep the carbonate buffering system in balance and to enhance adherence of the cells to the glass surface of the tube.

The top of the roller tube was sealed with a screw cap, and the tube was placed inside an incubator in a roller drum revolving at about 14 r.p.h. The temperature within the incubator was maintained at 37° C.

After 5 days the roller tube was removed from the incubator and observed to contain a confluent or full sheet of cells covering the inner glass wall of the tube. The supernatant nutrient tissue culture medium was poured off and about 20 ml. of 0.25% trypsin solution was added to the tube. The tube was then put back in the incubator and revolved once again at about 14 r.p.h. for from 10 to 15 minutes.

At the end of this time the tube was removed from the roller drum and agitated. The cell sheet was observed to release from the wall of the tube, and with further agitation the individual cells were dispersed.

The contents of the roller tube was aseptically poured off into a beaker. The tube was then rinsed with about 30 ml. of tissue culture medium, and this too was then aseptically poured into the beaker. A sample of the suspension was taken from the beaker and a cell count was made by microscope. Based on this cell count it was determined that the cell population of the roller tube had increased from 8 to 10 million to approximately 50 to 80 million cells.

In this manner a substantially tenfold increase in the cell population of the prescription bottle was attained in the roller tube within about 5 days.

The suspension in the beaker was then "split" or evenly divided into 4 parts by aseptically pouring it off into 4 roller tubes of the same dimensions as the first one. To each of these tubes was added sufficient nutrient tissue culture medium to bring the volume of liquid in the tube up to about 200 ml. These tubes were then placed in the incubator and again revolved about 14 r.p.h. for about 5 or 6 days, or until a confluent sheet was obtained, and the process was serially repeated as has already been described.

In accordance with the invention and as shown by the above described example, where formerly it was possible to obtain only a doubling of cell population by "splitting" from one prescription bottle to two, with the process of the present invention it is now possible to obtain a tenfold increase in cell population by transferring from a prescription bottle to a roller tube with a great saving of space, time, effort, and with less risk of contamination.

32-ounce prescription bottle contains only about 120 $cm.^2$ of effective surface area for growing cells, whereas a 62 cm. long, 6.3 cm. inside diameter roller tube contains about 1200 $cm.^2$ effective surface area for growing cells, or approximately 10 times the area of one 32-ounce prescription bottle. On the other hand, a 32-ounce prescription bottle requires about 50 ml. of tissue culture media to grow a confluent cell sheet on its 120 $cm.^2$ of surface area, whereas a roller tube requires only 150 to 200 ml. of tissue culture media to grow a confluent cell sheet on its 1200 $cm.^2$ of surface area.

A roller tube thus uses only 30 to 40% as much tissue culture media as a prescription bottle to grow the same number of cells. In accordance with the invention, the roller tube method of growing cells is thus much more economical, since the major limiting factor in large scale production of cells is the cost of media.

In addition to the WI 38 cell line described in the foregoing example, the following strains of mammalian cells have been propagated by the method of this invention with essentially the same results:

(1) Strain HeLa, an epithelia-type cell isolated by Gey et al. from human cervical carcinoma;

(2) HEP No. 2, isolated by Toolan from human epidermoid carcinoma;

(3) Primary monkey kidney cells;

(4) Primary canine kidney cells;

(5) Primary bovine embryonic kidney cells;

(6) WI 26, human embryonic lung cells isolated by Hayflick; and (7) BSC I, African green monkey kidney cells isolated by Hopps.

The example given above is merely illustrative of the principles of the invention which provides a new and useful method for propagation of a wide variety of mammalian cells to obtain physiologically active products of the cell metabolism, to provide living mammalian cell substrates for the propagation of viruses and other infectious agents, and to provide cells for diagnostic purposes and a wide range of experimental and test purposes, such as pharmacological and immunological assaying.

Although most of the steps in the process of this invention are not in and of themselves new and novel, the particular combination of steps constituting the invention is new and novel and produces an unexpected new and useful result over the procedures of the prior art.

The invention in its broader aspects is not limited to the specific details shown and described but departures may

What is claimed is:

1. In a method of propagating mammalian diploid cells in vitro which comprises the steps of:
   (a) aseptically planting mammalian diploid cells suspended in a nutrient tissue culture medium within a roller tube, the cells and medium occupying substantially less than the full volume of the tube,
   (b) sealing the tube and placing it in an incubator with its longitudinal axis substantially horizontal,
   (c) incubating the tube at a temperature of from 35° to 37.5° C. and maintaining the pH of the tissue culture medium between 6.8 and 7.8 to propagate the cells and form a confluent sheet of cells on the inner wall surface of the tube,
   (d) releasing the cells from the inner wall of the tube,
   (e) agitating the released cells to disperse them into small aggregates of cells, and
   (f) harvesting the cells, the improvement which comprises revolving the tube during incubation in step (c) at a speed of from 4 to 60 r.p.h. to permit the cells and medium to come into contact with substantially the entire inner wall surface of the tube and to form the confluent sheet of cells on substantially the entire inner wall surface of the tube.

2. The method as defined in claim 1, which includes the further steps of:
   (g) splitting the harvested cells into a plurality of tubes,
   (h) adding nutrient tissue culture medium to the tubes in an amount sufficient to insure bathing of the cells in a substantial quantity of medium when the tube is substantially horizontal, and
   (i) repeating the steps of the method defined in claim 1 to harvest a plurality of new, substantially confluent sheets of cells from the tubes into which the split was made.

3. The method as defined in claim 1, which includes after step (a) and before step (b), the step of charging the gas phase of the tube with a mixture of about 5% $CO_2$ in air to at least one-third of its volume before sealing the tube, whereby the gas phase of the tube contains from about 1.5 to 3% $CO_2$.

4. The method as defined in claim 1, in which the tube is revolved during incubation in step (c) for a period of at least three days.

5. The method as defined in claim 1, which includes after step (c) and before step (d), the step of aseptically pouring off supernatant tissue culture medium from the tube after the substantially confluent sheet of cells has been formed on the inner wall surface of the tube.

6. The method as defined in claim 5, which includes in step (d), the step of bathing the cell sheet within the tube in a cell-releasing solution after the supernatant tissue culture medium has been poured off and in step (e), the step of agitating the tube containing the cell-releasing solution to free the cell sheet from the tube wall and to disperse the cells into small aggregates of cells.

7. The method as defined in claim 6, which includes in step (d), the step of adding tissue culture medium to the released cells before agitating the cells.

8. The method as defined in claim 6, in which the cell-releasing solution comprises a balanced salt solution containing a small amount of trypsin.

No references cited.